Jan. 12, 1960  R. FRANZI  2,920,453
WHEEL CYLINDER FOR HYDRAULIC BRAKES
Filed Nov. 24, 1958  2 Sheets-Sheet 1

2,920,453

United States Patent Office
Patented Jan. 12, 1960

2,920,453

WHEEL CYLINDER FOR HYDRAULIC BRAKES

Riccardo Franzi, Turin, Italy, assignor to Fiat Societa per Azioni, Turin, Italy Application November 24, 1958, Serial No. 776,071

Claims priority, application Italy December 7, 1957

3 Claims. (Cl. 60—54.6)

This invention relates to a wheel cylinder for controlling hydraulic brake shoes, more particularly for motor vehicles, having the essential characteristic feature that it has associated therewith means for adjusting the play between the shoes and drum arising on wear and tear of the shoe friction linings.

Figure 1:
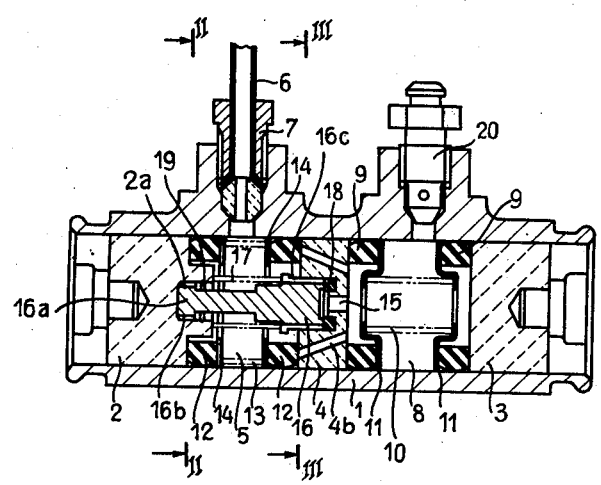
Figure 2:
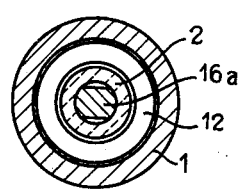
Figure 3:
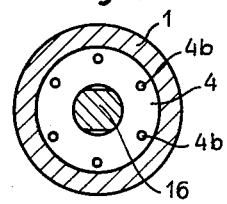
Figure 4:
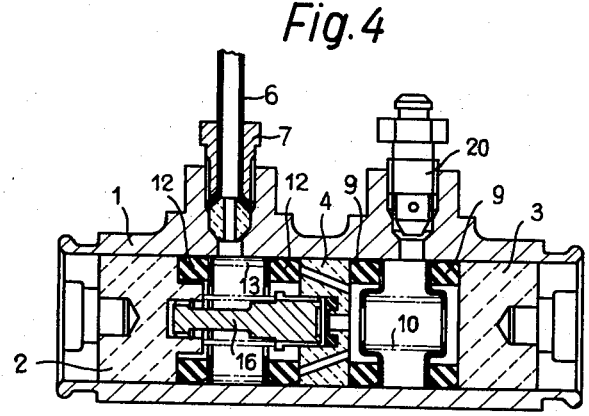
Figure 5:
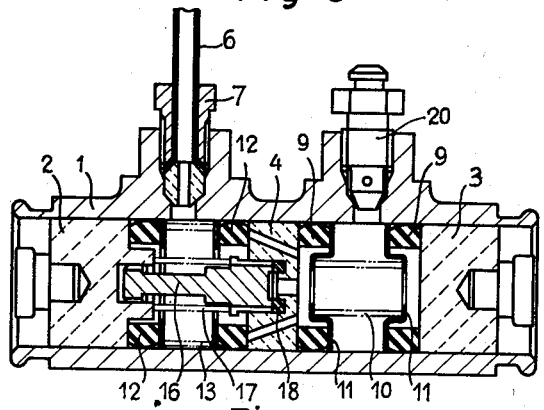
Figure 6:
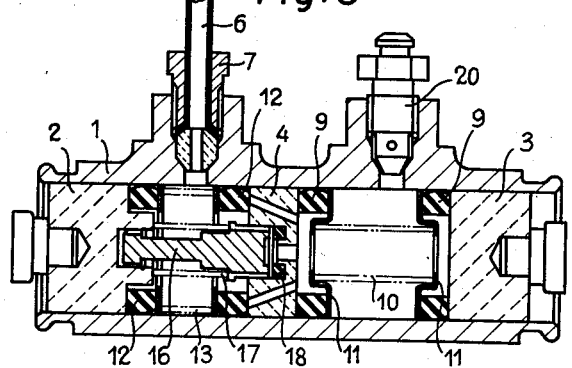
Figure 7:
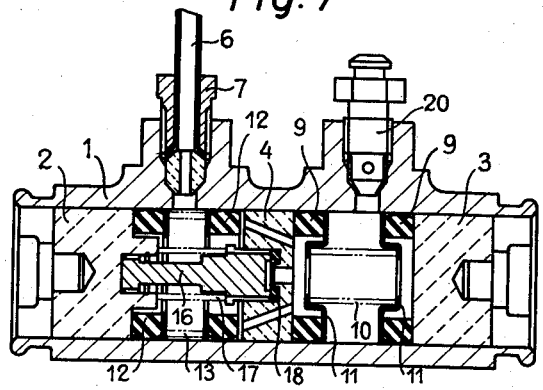

Further characteristic features of this invention will be understood from the appended detailed description referring to the accompanying drawings, given by way of a non-limiting example, wherein:

Figure 1 is an axial sectional view of the wheel cylinder in its inoperative condition, Figure 2 is a sectional view on line II—II of Figure 1, Figure 3 is a sectional view on line III—III of Figure 1 and Figures 4 to 7 are axial sectional views of the hydraulic cylinder similar in representation to Figure 1 in various operating conditions.

The wheel cylinder controlling hydraulic brake shoes comprises a cylinder proper 1 similar to standard constructions but of increased length.

The cylinder has pistons 2 and 3 movable therein actuating the shoes each of which is held against its respective piston by a conventional return spring.

A partition 4, which is likewise movable within the cylinder, is interposed in the cylinder chamber between the pistons 2 and 3.

The partition 4 subdivides the cylinder bore into a pressure chamber 5 confined by one face of the said partition and piston 2, and a compensating chamber 8 confined by the other face of the partition and piston 3.

A hydraulic liquid supply conduit 6 connected with the cylinder through a connection 7 of a type known per se opens into the pressure chamber.

The compensating chamber is sealed by two packing rings 9 of resilient material pressed by a spring 10 through the interposition of two conventional washers 11.

The pressure chamber 5 is sealed by means of packing rings 12 of conventional construction pressed by a spring 13 through washers 14.

The partition 4 has bored therethrough a central port 15 interconnecting the pressure chamber 5 and compensating chamber 8. The port 15 is controlled by a valve member 16 biased by a spring 17 against a packing 18 received by a seating provided in the partition 4; the spring 17 bears at its other end against the piston 2.

The valve member 16 is in axial lost-motion connection with the piston 2 by means of a head portion 16a provided thereon, which is received by a recess 2a in the piston 2, the head 16a being movable between the bottom of the recess 2a and a resilient splitter ring 19 seated in an annular groove cut in the surface of the recess 2a, longitudinal flats being provided on the head portion 16a to form liquid passages 16b.

The valve member 16 is moreover capable of displacement in a recess provided in the partition 4 and is formed with longitudinal flats 16c for the flow of liquid in the open valve condition to the port 15.

The chamber 8 can be connected with the outside by means of a drain valve 20 operable by hand.

The partition 4 has moreover bored therethrough peripheral ports 4b for discharging excess liquid from the compensation chamber 8 to the pressure chamber 5 on increase of the liquid volume in the chamber 8 such as by the action of heat.

The hydraulic cylinder operates in the following manner.

In the empty condition of the mechanism, when no liquid is contained therein, the pistons 2 and 3 biased by the shoe return spring compress the whole mechanism. In the pressure chamber 5 the valve 16 is held between the piston 2 and packing 18, the packing washers 11 compressing the spring 10 in the compensating chamber 8.

On draining in the open condition of the valve 20 (Figure 4) when liquid is supplied by the master cylinder or filling appliance, the piston moves outwardly carrying along the valve 16 and releasing flow of liquid to the compensating chamber and to the outside through the drain valve 20.

Upon draining the mechanism and closing the valve 20 the shoes are spaced from the drum beyond the prescribed play.

On acting upon the master cylinder liquid is delivered under pressure to the cylinder, moving the piston 2 outwardly, the said piston upon travelling over the path determined by the play between the piston and valve member 16 catching the said valve member and carrying it along, thereby releasing flow of liquid to the compensating chamber, so that both pistons are moved outwardly to move the shoes against the drum.

On releasing the brake pedal the pressure in the brake mechanism sinks down to a value, such as 7–8 atm. at which the shoes still slightly contact the drum. The valve member 16 biased by the spring 17 then shuts off the chambers from each other trapping in the compensating or expansion chamber 8 the liquid under a residual pressure such as to oppose the force of the shoe return spring on the pistons.

On further release of the pedal and fall in pressure, the length of the pressure chamber is reduced till the piston 2 rests through the splitter ring 19 on the head portion 16a on the valve member 16.

The prescribed play on the wheel cylinder is determined by the length over which the valve member 16 can travel with respect to the piston 2.

On normal braking (Figure 5) which does not entail any wear or tear or resilient or thermal yielding, the compensating chamber 8 does not receive any liquid in addition to the liquid quantity already contained therein but, if the length of travel increases beyond the prescribed play (Figure 6) both chambers are connected together, the compensating chamber trapping further liquid which increases the length thereof, thereby making up for wear and tear or yielding.

When yielding is due to heat, on ceasing of the latter effect the load on the pistons increases, which results in a rise in pressure within the compensating chamber 8. Such rise in pressure may alternatively result from an increase in liquid volume due to heating.

In both cases the pressure in the compensating chamber 8 cannot increase beyond a predetermined limit because the packing ring 12 urged by the spring 13 calibrated with respect to the diameter of the ports 4b, moves opening the ports and allowing discharge of excess liquid into the pressure chamber 5, hence into the master cylinder and reservoir, thereby returning the pressure in the compensating chamber 8 to the desired value.

The pressure and compensating chambers should of course be of such length as to leave the ports for supply of liquid and drainage free in any position of the internal component parts. The springs 13 and 17 are calibrated in accordance with the residual pressure in the chamber 5, which is related to the load by the shoe return springs. The load by the spring 10 should constantly be at any length of the said spring greater than the sum of the loads by the springs 17 and 13.

The improved play adjusting device affords the following advantages:

(1) Possibility of using an adjusting device on each wheel, thereby suiting adjustment to the operational conditions of the individual wheels;

(2) Possibility of discharging excess liquid to reestablish under any conditions the prescribed internal pressure and play;

(3) The device is fully enclosed by the wheel cylinder, which protects it against dirt and deterioration;

(4) Ease of assembly for the improved cylinder merely requires a greater space in length with respect to a wheel cylinder of conventional construction.

What I claim is:

1. In a wheel cylinder for expansible shoe brakes including a pair of pistons in opposite end regions of the cylinder bore, respectively, a transverse partition positioned slidable in the cylinder bore lengthwise of the cylinder, thereby defining a pressure chamber confined between the partition and one of the pistons and a compensating chamber confined between the partition and the other piston, a hydraulic fluid inlet opening into the pressure chamber, an axially directed passage in the partition connecting the pressure chamber to the compensating chamber, a valve member in the pressure chamber aligned with the passage to control hydraulic fluid flow through the latter, the said valve member having a lost-motion connection with the said one of the pistons in axial direction to thereby open the passage when the said one of the pistons and partition are moved away of each other through a length exceeding the lost-motion length, and spring means acting between the said one of the pistons and valve member to urge the latter towards the partition.

2. In a wheel cylinder for expansible shoe brakes including a pair of pistons in opposite end regions of the cylinder bore, respectively, a transverse partition positioned slidable in the cylinder bore lengthwise of the cylinder, thereby defining a pressure chamber confined between the partition and one of the pistons and a compensating chamber confined between the partition and the other piston, a hydraulic fluid inlet opening into the pressure chamber, an axially directed passage in the partition connecting the pressure chamber to the compensating chamber, a valve member in the pressure chamber aligned with the passage to control hydraulic fluid flow through the latter, the said valve member having a lost-motion connection with the said one of the pistons in axial direction to thereby open the passage when the said one of the pistons and partition are moved away of each other through a length exceeding the lost-motion length, and spring means acting between the said one of the pistons and valve member to urge the latter towards the partition, a pair of sealing rings in each of the chambers, spring means axially pressing the rings against the partition and respective piston thereby sealing the partition and piston against the cylinder bore, and a reflux passage in the partition connecting the two chambers, the said reflux passage being controlled by the sealing ring in the pressure chamber bearing on the partition, whereby excess of hydraulic fluid can flow back from the compensating chamber to the pressure chamber through the reflux passage.

3. In the wheel cylinder as claimed in claim 1, a purge valve branched from the compensating chamber, capable of venting the latter on filling of the cylinder with hydraulic fluid.

References Cited in the file of this patent
UNITED STATES PATENTS

| | | |
|---|---|---|
| 2,523,172 | Wilson | Sept. 19, 1950 |
| 2,815,830 | Oswalt | Dec. 10, 1957 |

FOREIGN PATENTS

| | | |
|---|---|---|
| 673,245 | Great Britain | July 4, 1952 |